Patented Feb. 2, 1932

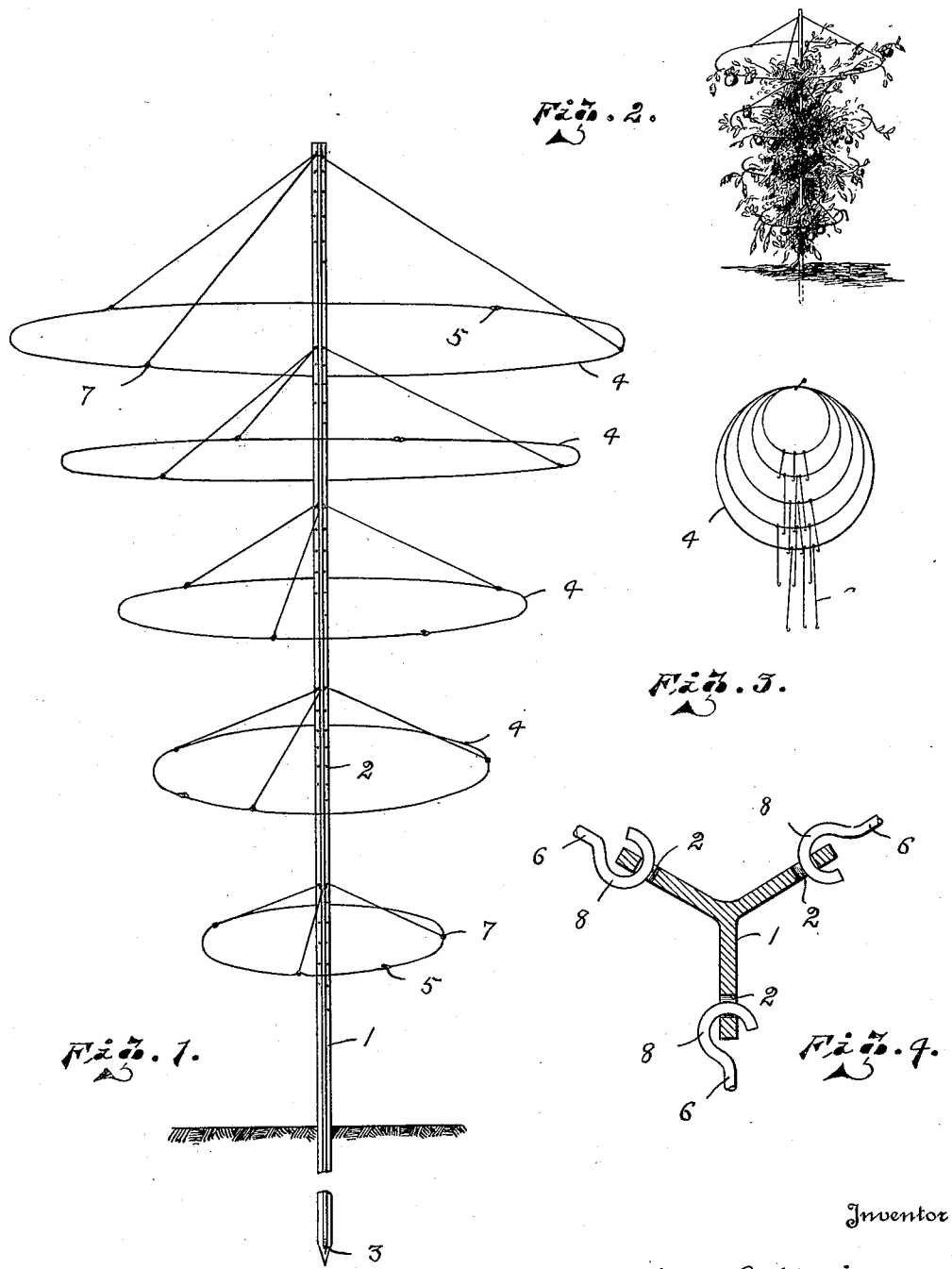

1,843,366

UNITED STATES PATENT OFFICE

ROBERT C. KREIMER, OF DULUTH, MINNESOTA

PLANT SUPPORT

Application filed September 21, 1929. Serial No. 394,206.

This invention relates to plant supports and has for its principal object to provide a more practical and adaptable support or trellis than heretofore known for various kinds of plants.

Another object is to provide such a support or trellis particularly adapted for use in connection with tomato plants.

Other objects and advantages of the invention will appear in the following description thereof.

Referring now to the accompanying drawings, forming part of this application, and wherein like reference characters indicate like parts:

Figure 1 is a perspective elevation of one of the supports as completely assembled;

Figure 2 is a reduced similar view of the trellis as applied to a tomato plant;

Figure 3 is an elevation of the plant engaging rings as they might appear in storage; and Figure 4 is an enlarged transverse sectional view of the preferred form of supporting stake through one of the connections with one of the plant engaging rings.

1 represents the preferred form of post or stake which in cross section presents three equi-distant radially extending webs, or distorted Y-shape in form, each web being provided adjacent its outermost free edge with a series of holes 2 preferably substantially the entire length of the stake except as to that portion which it is desired to force in the ground, as by driving or the like, the lower end being sharpened as at 3 for such purpose.

4 represents wire rings made preferably circular in form, the ends being hooked together as at 5, though may be fastened in any other desired manner as by twisting or the like. While these rings may be of uniform size or varied as preferred I have shown the latter as being graduated somewhat from the lowermost small one to the uppermost large one, and I have illustrated five of these rings as applied to the post but as is obvious any number may be used to suit the size of the plant being supported. In fact it is the intention in carrying out the novel functioning of the device to apply the rings 4 to the post consecutively as needed, the smaller one first, and then the next larger and so on; or two or more of a like size, just as circumstances require. For such application of the rings to the post there is provided a plurality of supporting wires 6, being freely connected as at 7 by a suitable loop in the wire to the ring, the other end being provided with a hook 8 for engagement within any hole 2 desired in the post.

While I have shown the preferred type of stake as of triple web form, it is evident that a four web stake might be used to equally good advantage, and in which event four radial supporting wires 6 might be used, or these may be adjustably attached to the stake in some other manner without departing from the spirit of the invention.

As previously stated the trellis is particularly applicable as a support for tomato plants, and by extensive experience I have proven at least to my own satisfaction that a tomato plant if properly supported and left untrimmed will produce a much better and more satisfactory yield than by any other method of treatment.

Having thus described my invention, what I claim and desire to secure by Letters Patent, is:

1. A plant support comprising a stake, a plurality of plant engaging rings arranged concentrically and in spaced relation about the stake and a plurality of supporting members attached at one end to each ring, the other end having means for removable attachment directly to the stake.

2. A plant support comprising a stake, a plurality of plant engaging rings arranged concentrically and in spaced relation about the stake, a plurality of supporting members attached at one end to each ring, the other end having means for removable attachment to the stake, and fixed means upon the stake for cooperative engagement with the supporting members.

3. A plant trellis comprising a single supporting member for engagement with the ground and a plurality of graduated plant engaging rings adjustably and concentrically arranged about the supporting member, said member extending axially through said rings.

4. A plant support comprising a stake, a plurality of plant engaging rings graduated in size and concentrically suspended in spaced relation about the stake, said stake extending axially through the rings.

In testimony whereof I affix my signature.

ROBERT C. KREIMER.